United States Patent
de la Chevrotiere

(10) Patent No.: US 9,967,311 B2
(45) Date of Patent: May 8, 2018

(54) SYSTEM AND METHOD FOR INTEGRATION OF BROWSER BASED APPLICATIONS IN A MANAGED APPLICATION ENVIRONMENT

(71) Applicant: Open Text SA ULC, Halifax (CA)

(72) Inventor: Eric Andre de la Chevrotiere, Ayr (CA)

(73) Assignee: Open Text SA ULC, Halifax, CA (US)

( * ) Notice: Subject to any disclaimer, the term of this patent is extended or adjusted under 35 U.S.C. 154(b) by 508 days.

(21) Appl. No.: 14/602,953

(22) Filed: Jan. 22, 2015

(65) Prior Publication Data
US 2015/0215370 A1  Jul. 30, 2015

Related U.S. Application Data

(60) Provisional application No. 61/932,600, filed on Jan. 28, 2014.

(51) Int. Cl.
*H04L 29/08* (2006.01)
*H04L 29/06* (2006.01)

(52) U.S. Cl.
CPC .............. *H04L 67/02* (2013.01); *H04L 67/18* (2013.01); *H04L 67/306* (2013.01); *H04L 67/42* (2013.01)

(58) Field of Classification Search
CPC ....... H04L 67/02; H04L 67/18; H04L 67/306; H04L 67/42; G06F 17/30899; G06F 9/4443; G06F 9/4843; G06F 3/048; G06F 3/0481
See application file for complete search history.

(56) References Cited

U.S. PATENT DOCUMENTS

| | | | | |
|---|---|---|---|---|
| 8,826,276 B1* | 9/2014 | Li | ........................ | G06F 9/4843 709/226 |
| 2002/0188862 A1* | 12/2002 | Trethewey | ............ | H04L 63/083 726/4 |
| 2004/0024843 A1* | 2/2004 | Smith | ................... | G06F 9/4443 709/219 |
| 2006/0053224 A1* | 3/2006 | Subramaniam | ....... | G06F 9/4443 709/227 |
| 2006/0080397 A1* | 4/2006 | Chene | .................... | H04L 67/00 709/213 |
| 2008/0184157 A1* | 7/2008 | Selig | ...................... | G06F 17/243 715/781 |
| 2010/0153483 A1* | 6/2010 | Offermann | ............ | G06F 9/4443 709/203 |
| 2013/0086151 A1* | 4/2013 | Guo-Boynton | ........... | G06F 9/54 709/203 |
| 2014/0344806 A1* | 11/2014 | Suresh | .................. | G06F 9/4445 718/1 |

* cited by examiner

*Primary Examiner* — Vivek Srivastava
*Assistant Examiner* — Todd L Barker
(74) *Attorney, Agent, or Firm* — Sprinkle IP Law Group

(57) ABSTRACT

Embodiments as disclosed may include an integration application that allows multiple disparate applications to be integrated. Specifically, in certain embodiments, a method of providing multiple browser-based applications through a single interface may include providing a single interface, configured for integrating the multiple browser-based applications, to a user, wherein the single interface has a parent area associated with a set of applications and a child area for presenting content associated with the set of applications.

18 Claims, 13 Drawing Sheets

SYSTEM AND METHOD FOR INTEGRATION OF BROWSER BASED APPLICATIONS IN A MANAGED APPLICATION ENVIRONMENT

CROSS-REFERENCE TO RELATED APPLICATION(S)

This application claims a benefit of priority under 35 U.S.C. 119 to U.S. Provisional Application No. 61/932,600, filed Jan. 28, 2014, entitled "SYSTEM AND METHOD FOR INTEGRATION OF BROWSER BASED APPLICATIONS," which is hereby incorporated herein for all purposes.

TECHNICAL FIELD

This disclosure relates generally to systems and methods for integration of browser-based applications in a managed application environment. Specifically, this disclosure relates to systems and methods for providing integration of the presentation and functionality of multiple disparate browser-based applications in a managed application environment.

BACKGROUND

A problem that arises generally in a distributed computer environment and that may be particularly acute in an enterprise context is that, typically, there are a number of different applications in use. These applications may have been developed at multiple times, by multiple different developers or entities (e.g., by different groups in an enterprise). Accordingly, these applications may likely have differences in look and feel, resulting in an appearance and function that is not cohesive in nature.

For example, different applications may require different logins or perform user authentication in a different manner. Additionally, such applications may not appear ("look") or function ("feel") the same. This situation leads to inefficiency in the use of such application as each application must be individually learned and accessed and the functionality of such applications is siloed such that functionality or data associated with one application is inaccessible when using another application.

It is desired, therefore, to provide some level of integration to heterogeneous applications in a distributed computing environment such as an enterprise so the applications included in that environment may have a similar look and feel, and functionality or data from one application may be provided to a user even when the user may be in the context of a different application.

SUMMARY

To address these concerns, among others, embodiments as presented herein may present an integration application that allows multiple disparate applications to be integrated. Specifically, in certain embodiments, a method of providing multiple browser-based applications through a single interface may include providing a single interface, configured for integrating the multiple browser-based applications, to a user, wherein the single interface has a parent area associated with a set of applications and a child area for presenting content associated with the set of applications.

In certain embodiments, the integration application may be configured to receive, from the parent area, a selection of a particular application from the set of applications associated with the parent area and present content of that application in the child area. With respect to the browser through which the content is being presented, the parent uniform resource locator or indicator (associated with presentation of the content of that application) includes a domain identifier and parameters associated with that application. When a selection of another application of the set of applications associated with the parent area is received content of this application may also be presented in the child area without alteration to at least a portion of the parent area and the parent URL is updated so that the parent URL associated with the content of the second application includes the domain identifier and parameters associated with the second application.

A system is provided for integration of multiple applications in a managed application environment. The system comprises a single interface deployed on a client computing device coupled over a network to an application server and an integration application server. The single interface may be configured for integrating multiple applications to a user. The single interface includes a parent area associated with a set of applications and a child area for presenting content associated with the set of applications. The client computing device includes a browser presenting the single interface and the integration application server includes an integration application to configure the client computing device in association with the browser. The system further comprises a first link to a first application provided by the application server in the parent area to receive a first selection of the first application from the set of applications associated with the parent area for presenting content of the first application in the child area. A parent URL may be associated with presentation of the content of the first application includes a domain identifier and parameters associated with the first application. The system further comprises a second link to a second application provided by the application server in the parent area to receive a second selection of the second application from the set of applications associated with the parent area for presenting content of the second application in the child area without alteration to at least a portion of the parent area. The presenting of the content of the second application includes updating the parent URL so that the parent URL associated with the content of the second application includes the domain identifier and parameters associated with the second application.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

DETAILED DESCRIPTION

Figure 1:
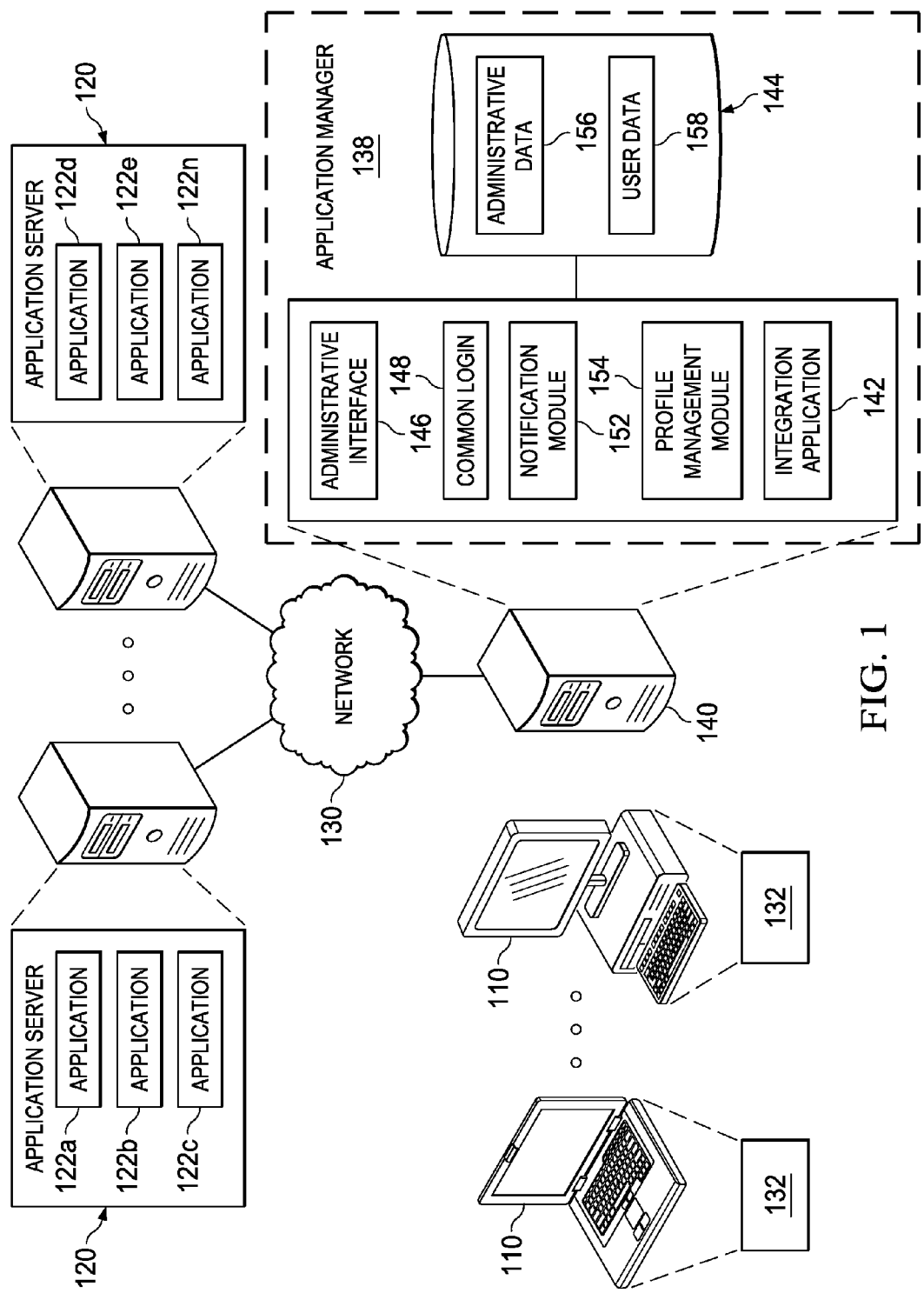
FIG. 1 is a block diagram illustrating one embodiment of an architecture for an integration application.

Before delving into more detail regarding the specific embodiments disclosed herein, some brief context may be helpful. In today's heterogeneous computing environments users may have multiple computing devices (e.g., mobile devices, tablet, laptop, desktop computer, etc.) with multiple applications available to the user on each device, where those devices may, in turn, be used in multiple environments or locales. These users may be members or otherwise associated with (e.g., employees, users, etc.) a particular enterprise and use these computing devices to access computing devices or data associated with that enterprise.

It is often the case, however, that it is desired to control users' accesses to particular applications, to present a common look and feel in conjunction with those applications or to provide functionality associated with multiple applications while a user is accessing the functionality of only one of those applications. Accordingly, what is desired is an integration module that allows multiple applications or web pages (collectively referred to herein as applications) such as web pages, web based applications, HTML5 pages or applications, etc., that have been developed and implemented separately (or in conjunction) to be integrated.

To that end, embodiments as presented herein may present an integration application (embodiments of which are also referred to herein as a common header) that allows multiple disparate applications to be integrated. Specifically, in certain embodiments, a method of providing multiple browser-based applications through a single interface may include providing a single interface, configured for integrating the multiple browser-based applications, to a user, wherein the single interface has a parent area associated with a set of applications and a child area for presenting content associated with the set of applications.

The integration application may be configured to receive, from the parent area, a selection of a particular application from the set of applications associated with the parent area and present content of that application in the child area. With respect to the browser through which the content is being presented, the parent uniform resource locator or indicator (collectively URL) associated with presentation of the content of that application includes a domain identifier and parameters associated with that application. When a selection of another application of the set of applications associated with the parent area is received content of this application may also be presented in the child area without alteration to at least a portion of the parent area and the parent URL is updated so that the parent URL associated with the content of the second application includes the domain identifier and parameters associated with the second application.

Such an integration application may also be configured to manage the authentication process of the user with respect to multiple browser-based applications with which it is configured to utilize. For example, in certain embodiments a user credential may be received through the single interface and the user may be authenticated with respect to these multiple browser-based applications based on the user credential.

In certain embodiments, the single interface may be an integration application that is loaded into a web browser. The integration application includes the parent area that is a banner or header area while the child area may be an iframe of the integration application (e.g., an iframe contained, or implemented by, the parent area).

The parent area may present a variety of functionality to the user. In one embodiment, the parent area may be configured to identify a set of browser-based applications based on the user (e.g., the user's authentication credentials) and authenticate the user to these set of browser-based applications, such that the user can utilize the functionality of the set of browser-based applications without further authentications. Essentially, then, any browser-based application that can be loaded into an iframe may be compatible with such an integration application. The integration application uses iframe technology to integrate these applications into an existing web page that presented the parent area.

Specifically, in certain embodiments, when a user launches the integration application, a user may be presented with a login screen which may utilize authentication protocols (including, but not limited to, CAMS (or Cams), OpenText Directory Services (OTDS) or OpenText Application Gateway (OTAG)) to provide a single sign on experience to the end user. Any application which uses one of the authentication protocols utilized by the integration application is thus compatible with the single sign on feature.

Moreover, the parent area may be configured to present context sensitive help to the user, such that based on one or more criteria, such as the application selected by a user or currently being presented in the child area, the user, etc. appropriate help options or content may be presented to the user.

Additionally, the integration application may be a single application that utilizes interfaces (such as application programming interfaces (APIs) or the like) provided by the set of browser-based applications presented in the parent area to present substantially real-time notifications from these set of browser-based applications through the parent area, even in cases where the user is interacting with another browser-based application in the child area. Such notifications may be presented without the user having to refresh the browser, and without any interruption to the browser-based application with which they are currently interacting. The user can interact with notifications to, for example, accept sharing requests.

Such an integration application may maintain a user profile for each user. At least a portion of which may be managed through the integration application by the user. The user can also manage this portion of their profile (e.g., a profile picture, password, etc. from the integration application).

The content that appears in the parent area of the integration application may be configurable by a system administrator through an administration interface. For example, an administrator may define one or more groups and a user may be assigned to one or more groups by the administrator. For a group an administrator may define the browser-based applications that will appear in the parent area (e.g., the application to which a user of that group will have access); an administrator can define the names, an appearance of a link to that application in the parent area (e.g., add a custom image for that application) app, a help link that will appear in the parent area when a user is interacting with that application, etc.

Furthermore, an administrator may define the level of functionality of such an application that may be accessed through the parent area. In this manner, when a user access the integration application the parent area will be configured according to the configuration defined for his group (or that particular user, in the case where a group may be defined as a single user) by the administrator.

One particular advantage of the use of embodiments of such an integration application is that, with minimal effort, other applications that have been developed completely separately, and even by third parties, can be integrated into a single web solution. This solution can be reused for any other developer who wants to pull in multiple web sites into a single web site.

It may now be helpful here to discuss embodiments of various architectures that may be utilized in performing embodiments as disclosed herein. Referring first to FIG. 1, one embodiment of an architecture for a system that includes an integration application is depicted. The architecture includes one or more computing devices 110 connected to an application server 120 and an integration application server 140 over a network 130. The network 130 may be a wired or wireless network such as the Internet, an intranet, a LAN, a WAN, a cellular network, another type of network.

It will be understood that network 130 may be a combination of multiple different kinds of wired or wireless networks. It will also be understood that while an integration application server 140 and the associated integration application have been depicted as a distinct entity for purposes of this description, the integration application server 140 and module 142 (and associated modules, data, etc.) may be implemented as multiple entities, or integrated with other entities such as an application server 120, etc.

Computing devices 110 may be mobile devices (such as smartphones, laptop computers, personal data assistants (PDAs), etc.), desktop computers, servers, or other computing platforms, or any other type of device that can process instructions and connect to network 130. More specifically, computing devices 110 may access network 130. Each computing device 110 may include a browser 132 as is known in the art.

Application server 120 may be an application server that implements, supports or interfaces with one or more applications 122. Examples of such an application server 120 may be an AppWorks or OpenText Application Gateway by OpenText.

Integration application server 140 may include an integration application 142 that may be accessed from computing device 110 when requested and executed (e.g., rendered, interpreted, compiled, executed, or otherwise accessed to configure the computing device 110) in association with the browser 132 on the computing device 110. When accessed through the browser 132 on the computing device 110, the browser 132 of that computing device 110 may be configured by the integration application 142 to present a single interface including a parent area and a child area. It will be noted here that the integration application 142 may be configured as modules on the integration application server 140, modules configuring the browser 132 or a combination of the two.

The parent area may provide links to multiple applications 122, a help menu, a notification area, or other functionality. By selecting an application 122 in the parent area, content associated with the selected application 122 may be presented in the child area. A user may interact with the application 122 in the child area. The child area can then present the content associated with the application 122 while the parent area remains substantially unchanged. If a user selects a different application 122 using the parent area, the content associated with that application 122 can then be presented in the child area, again without alteration to the parent area.

In one embodiment, the parent area or common header or top bar may be a web page in a web browser window. An associated area called a child area is provided as an iFrame of the parent area in which the content of an application 122 will be loaded. The iFrame essentially functions as a browser located within the web page defined by the parent area.

Additionally, integration application server 140 may include an application manager 138 which may include one or more modules and data in data store 144 to support the execution and use of integration application 142 in association with computing device 110. Specifically, these modules may include an administrative interface module 146, a profile management module 154, a common login module 148 and a notification module 152. Profile management module 154 may allow a user to manage his authentication credentials, the appearance of the integration application (e.g., color, size of areas presented, profile picture), etc. This user data 158 is stored in data store 144.

Administrative interface module 146 may allow an administrator to access the integration application server 140 and define the functionality or appearance of integration application 142 when executing in conjunction with a particular user or may allow the definition of the appearance or functionality of the integration application 142 in conjunction with a particular application 122

More specifically, the administrative interface module 146 may present one or more browser based interfaces by which an administrator can assign a user to a group and define the appearance and functionality of the integration application 142 when the integration application 142 is executing on the browser 132 of a user who is a member of that group. For example, the administrative interface module 146 may allow an administrator (which may be a user at a computing device 110 with proper credentials) to define one or more applications 122 which may be accessed through the parent area of the integration application 142 when the integration application 142 is accessed by a user of a particular group; the appearance of the link for that application 122 (e.g., an image, the text for the link, etc.) in the parent area; and a help menu that will appear in the parent area when a particular application 122 is accessed by a user. Such administrative configuration data 156 is stored in data store 144.

In one embodiment, each application 122 may have a configuration file (e.g., in administrative data 156) that defines, for example, a URL to access in conjunction with the application 122, data that defines how the application is to be presented (e.g., an icon) by integration application 142, a help link (e.g., a URL to be presented through a link to a help menu), or other data. Such configuration data for an application 122 may for example, be provided through a configuration file provided to application manager 138 (e.g., through administrative interface 146). Such a configuration file may comprise a zip configuration file containing the configuration data for specified settings. Accordingly, through administrative interface 146 an administrator can control whether an application 122 is enabled or disabled, the different audiences of that application 122 (i.e., who can access the application 122), etc.

Common login module 148 may allow a user to login a single time using integration module 142 executing on the browser 132 and access all (or a subset of) the applications 122 presented through the parent area of the interface presented by integration application 142. Specifically, common login module 148 may employ an authentication protocol such as CAMS, OTDS or OTAG. When the integration application 142 is initially executed on a user's browser 132 the user may be presented with an authentication interface. The user may provide authentication credentials to the common login module 148 through this interface. If the user is authenticated by common login module 148 login credentials may be sent to the integration application 142 on the user's computing device 130. Using these login credentials (e.g., an authentication token or the like), any application 122 that may be accessed through the parent area which adheres to a supported authentication protocol may be accessed without further authentication.

For a single sign-on process, single sign-on data may be stored in the data store 144 (e.g., as part of administrative data 156). In one embodiment, common login module 148 may use an authentication mechanism such as OpenText Application Gateway (OTAG) that utilizes an authentication library such as Open Text Directory Services (OTDS) to handle managing of the users. Using such an authentication library a token is passed into when a user sign in and a token is received back from the authentication library. The received token is used in the application 122 to validate the user.

Notification module 152 is configured to provide notifications associated with applications 122 presented through the parent area of the integration application 142. In some embodiments, applications 122 may be designed to provide notifications regarding various aspects of their functionality. For example, applications 122 may be configured to provide notifications, sharing or messaging between users utilizing the application (e.g., a social application or the like), may be configured to provide notification regarding the storing or updating of certain content, or for a wide variety of other reasons.

These applications 122 or the application server 120 providing these applications 122 may provide an API or other type of interface by which an application or device may register to receive notification. Accordingly, when the integration application 142 is executed on a browser 132 it may register with the notification module 152 that it wishes to receive notifications with respect to the application 122 that are being presented through the parent area of the integration application 142 (or a subset thereof). Using the interfaces provided by those applications then, the notification module 152 may register with these applications 122 based on the authentication credentials of the user (e.g., such that the user receives appropriate notifications).

Accordingly, when an application 122 has a notification intended for the user it may pass the notification to the notification module 152 which, in turn, provides the notification to the integration application 142 executing on the user's computer 110. The integration application 142 can then present this notification through the parent area such that the user can interact with the notification (e.g., accepting a request or message), switch to an appropriate application or take another desired action based on the notification. In this manner, notifications may be presented without the user having to refresh the browser 132, and without any interruption to the application with which they are currently interacting in the child area.

It will be useful here to go into more detail regarding the operation of embodiments of such an integration application. Moving to FIG. 2, then, an embodiment of an integration application is illustrated. Initially, a user of a computing device 210 may open browser 232 and access a location (e.g., a URL) associated with a server 240 providing integration application 242. Integration application 242 may respond to the request from the browser 232 with a single interface 200 which is presented through browser 232. Single interface 200 may initially present a login interface as discussed above, by which the user may be authenticated using common login module 248 and the authentication credentials configured by the user.

When the user is authenticated the integration application 242 may determine a group associated with the user, a set of applications associated with that group, the setting of the user's profile, etc. based on the information in the data store 244 configured by an administrator or the user. Once the user is authenticated the integration application 242 may present a parent area 260 and a child area 270 through the single interface 200. The child area 270 may be an iframe of the parent area 260 such that a URL distinct from the URL associated with the parent area 260 may be accessed through the child area 270. Parent area 260 includes one or more links 206 to applications 222 provided by application server 220. The links 206 presented to the user through the parent area 260 may be associated with, and configured to access, the applications determined from the user based on the user's login, the group for the user and the applications 222 configured for the user's group. For example, link 206a may be associated with and configured to access application 222a, link 206b associated with and configured to access application 222b, and link 206c may be associated with and configured to access application 222c. Parent area 260 may also present an avatar or other indication 264 that the user is authenticated and a help menu 266.

A user may the select a link 206 associated with an application (e.g., link 206a). When that link 206 is selected the integration application 242 can then present the selected application (e.g., content associated therewith and provided by the application associated with the link 206) through the child area 270. Specifically, the selected application may be presented in the iframe corresponding to the child area 270. The user may thus interact with the selected application 222 in the child area 270 while the parent area 260 remains unaltered. Additionally, the integration application 242 may update the URL of the browser to reflect the application being accessed.

In some embodiments, when a particular link 206 is selected, the help menu 266 in the parent area 260 may be configured by the integration application 242 to link or otherwise provided access to a help menu or information corresponding to the application 222 associated with the selected link 206. Furthermore, as the user interacts with the application 222 the help menu may be continually updated such that it is configured to access a help menu of help data associated with the content of the application 222 being presented through child area 270.

In one embodiment, using a link 206 the associated application may be accessed, and content provided by the associated application 222 may be loaded into the iFrame of the child area 270. Browser 232 may handle interaction with the content presented in the parent area 260 and child area 270 including navigation (e.g., clicking "back" or "forward"). For example, navigation may be handled such that by clicking a link in the child area 270 then clicking "back" will take you back to the previous content presented in the child area 270. Any interaction with the content presented through the interface 200 may be redirected to the authentication interface 246 if the user is not authenticated (e.g., for a particular interaction or the application itself).

A user may select another link 206 in the parent area 260 at any time, and that application 222 accessed and content associated with that application 222 presented in the child area 270 without alteration to the parent area. Similarly, the help menu 266 may be update reflect the selection of this new link 206 (e.g., that a different application 222 is being presented through child area 270).

In many cases, then, the parent area 260 and the child area 270 may be on different domains (e.g., different protocols, different domain or different port). In order to accommodate the use of different domains through a single interface, in one embodiment, javascript (or other logic) of the single interface 200 may be used to set "document.domain" of the single interface 200 the parent area's 260 domain. So, for example, if the parent area's 260 domain was test.example.com, the document.domain may be set to 'example.com'.

In such cases, the child area 270 may also include such logic to allow sibling domains to interface, (for example, test.example.com and test2.example.com). In other embodiments to allow different domains to interact using a single interface 200 these domains (e.g., external domains) may be run through a proxy server, which makes the domains appear to be the same domain. Advantageously, the above described management of domain information may reduce or eliminate problems using the single interface 200 when attempting to load an existing website into an iframe within the child area (via, for example, a website link within the parent area) when such a website does not by default allow itself to be loaded into an iframe.

For example, in an embodiment, if a user clicks on a web-link inside the child area or iFrame, the URL displayed in the common header window of the web browser changes. A first portion of the URL corresponds to the integration application 242 and a second portion of the URL corresponds to a web page the user is on inside the child area or iFrame. So even if the user were to refresh the web page, he can navigate around back instead of going back to the very start default integration application web page. So a user can navigate in an application, pick different URLs, and the URL in the integration application 242 would be changing without a page refresh of the integration application 242 as only the child area or iFrame will be changing.

It also may be desired to allow users some degree of interaction with the URL presented in the address window 280 of the browser 232 to allow a user to retain certain functionality such that the user may copy browser address line 280, to allow emailing/bookmarking links etc. However, it also desired that when a user pastes or bookmarks (and subsequently clicks) an address from the browser address window 280 the user is taken to the application and content (e.g., page) they were on in the child area 270 in a manner such that it is presented through the single interface 200 of the integration application 242 with the parent area 260, such that the look and feel of the integration application 242 can be maintained and authentication protocols not circumvented.

As such, the integration application 242 may update the URL associated with the single interface 200 or parent area 260 thereof with information reflecting the current status of the child area 270 (e.g., the application 222 and content being presented therein). By doing so, the ability to copy, paste, bookmark, etc., URLs is maintained while ensuring that such access will go through integration application 242. A non-limiting mechanism for achieving this end is to periodically poll (for example, using javascript) the current child URL and the location within the child area 270. If the child's location has changed, the parent's URL may be modified to reflect the current child URL (for example, by pasting at least a portion of the child URL string to the end of the parent URL string). The parent's URL may then be used (for example, by saving it as a bookmark or inserting it as a link within a document, email, etc.) to redirect the single user interface 200 to not only reload a desired parent area URL, but also a desired particular location within the child area 270.

In one embodiment, such functionality may be accomplished using hash URLs. Hash URLs, for example, http://en.wikipedia.org/wiki/Beethoven#Late_works, do not cause the page to reload when they are clicked or otherwise activated. In some instances, a hash URL may have two portions a portion preceding a hash identifier (e.g., "#") and a portion following this hash identifier.

So, when the user navigates within child area 270, the URL of the parent area 260 is updated with some identifying information about the current URL corresponding to the child frame. For example, a hash URL may be http://webaccess.opentext.com#url %3Dhttp%3A%2F%2Fwebaccess.opentext.com%2Ftest.jsp%26tab%3D1259. In such instances, a first portion of the URL "webaccess.opentext.com" may be associated with the domain of the integration application 242 itself while a second portion of this URL following the "#" (known as the #url portion) of the URL may identify the location of the application or content being accessed through the child area 270. Accordingly, a subsequent access to this URL would cause an access to the same location through the integration application 242, as this URL references both the location of the integration application 242 (e.g., indicated in the first portion of the URL) and the identity (e.g., in the second portion of the URL) references the application or content that should be loaded in child area 270.

In other embodiments, it may be desired to reload the single user interface 200 to include a series of links 206 within the parent area 260 where one of the links 206 is selected based on the link 206 that was selected the last time the single user interface 200 was loaded. This may be accomplished by tracking the currently selected link 206 and appending information identifying the link 206 to the child area URL. In this way, when the URL is bookmarked or inserted into a document, email, etc., and selected, the appended information may be read and used to activate the link 206 in the single user interface 200.

Figure 2:
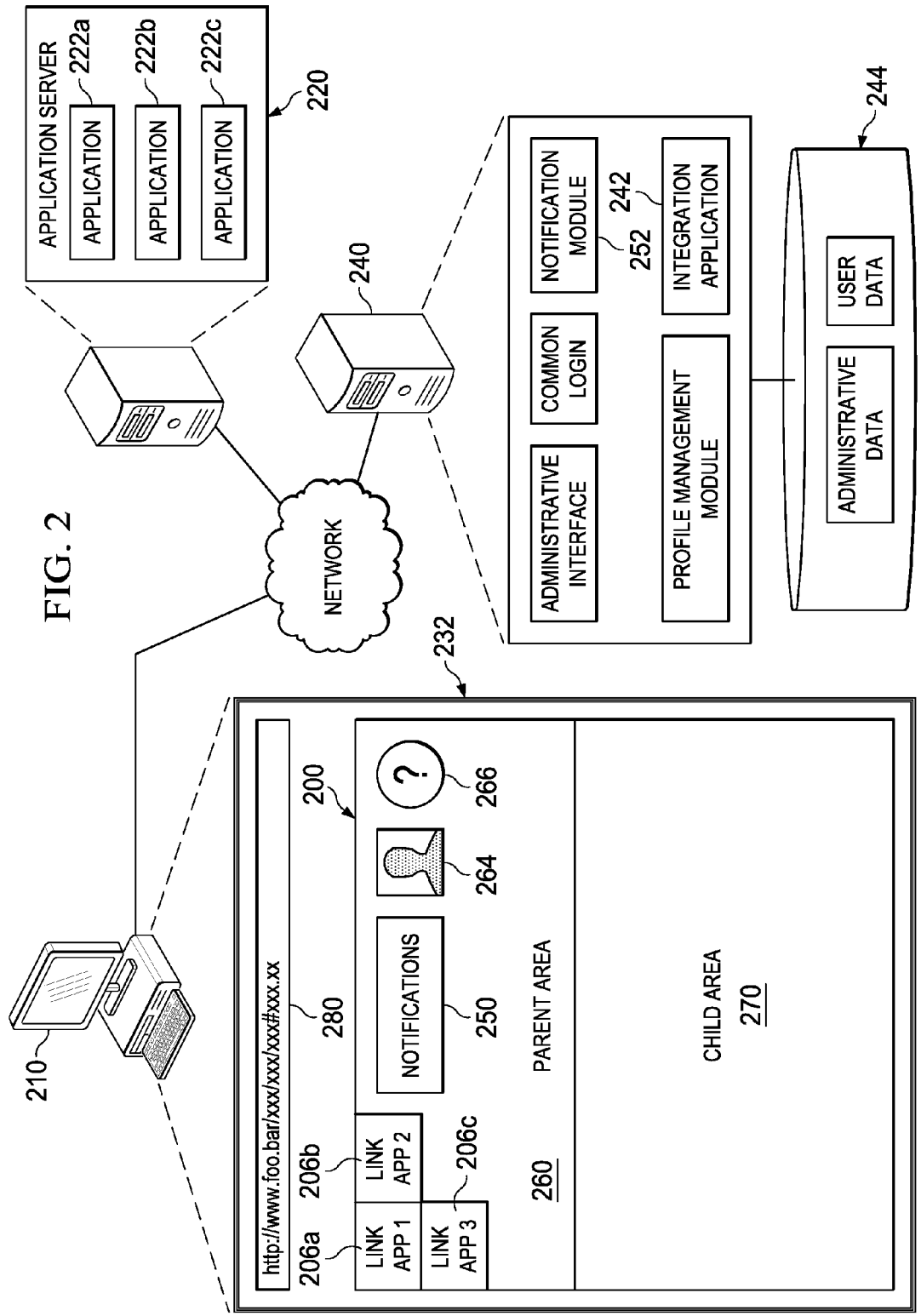
FIG. 2 is a block diagram illustrating one embodiment of an architecture for an integration application.

In one embodiment, an application (e.g., Java script) or tag may be utilized such that as a user interacts with a URL or other feature presented in the child area 260 the URL gets reported to the parent area 270. Such an application may provide permission to the integration application 242 to determine when a user clicked on a web-link in their web browser in the child area 270 and what that URL is so that the integration application 242 can change the URL in the web browser 232. The URL shown in FIG. 2 is the following: http://www.foo.bar/xxx/xxx/xxx#xxx.xx. The URL address portion appearing after the hashtag (#) is read by the parent and deciphered to what application tab to highlight, and what URL the user was at.

As the user may be able to interact with multiple applications 222 through the child area 270 of the single interface 200 of the integration application 242 while the parent area 260 of the single interface 200 remains unaltered it may be desired to present notifications associated with these applications 222 to the user through the parent area 260 even in cases where the user may not be interacting with that application 222 in the child area 270. As such, notification area 250 may be provided in parent area 260 such that these notifications may be presented through the parent area 260.

More specifically, applications 222 may provide the ability to "register" or otherwise notify the application 222 that a module or device is to receive a notification associated with that application (and which may be associated with a particular user). These applications 222 or the application server 220 providing these applications 222 may provide an API or other type of interface by which the module or device may register to receive such notification. Accordingly, when the integration application 242 is executed on the browser 232 it may register with the notification module 252 or directly with the application 222 itself to receive notifications with respect to one or more applications 222 that are being presented through the parent area 260 of the integration application 242.

In some embodiments, such a registration may be done in conjunction with an authentication associated with the application 222 or the registration may include user identification information. In these instances, the registration with the notification module 252 or with the application 222 itself may register the integration application 242 associated with that user's browser 232 to receive notifications with respect to the one or more applications 222 that are associated with that user.

Accordingly, when an application 222 has a notification intended for that user it may pass the notification (e.g., using the API) to the notification module 252 which, in turn, provides the notification to the integration application 242 executing on the user's computer 210. Alternatively, the notifications may be provided directly from the application 222 to the integration application 242 executing on the user's browser 232. Other configurations are also possible.

The integration application 242 can then present this notification through the notification area 250 of the parent area 270 such that the user can interact with the notification through the notification area 250 (e.g., accepting a request or message), switch to an appropriate application or take another desired action based on the notification. In this manner, notifications may be presented without the user having to refresh the browser 232, and without any interruption to the application with which they are currently interacting in the child area 270.

Figure 3:
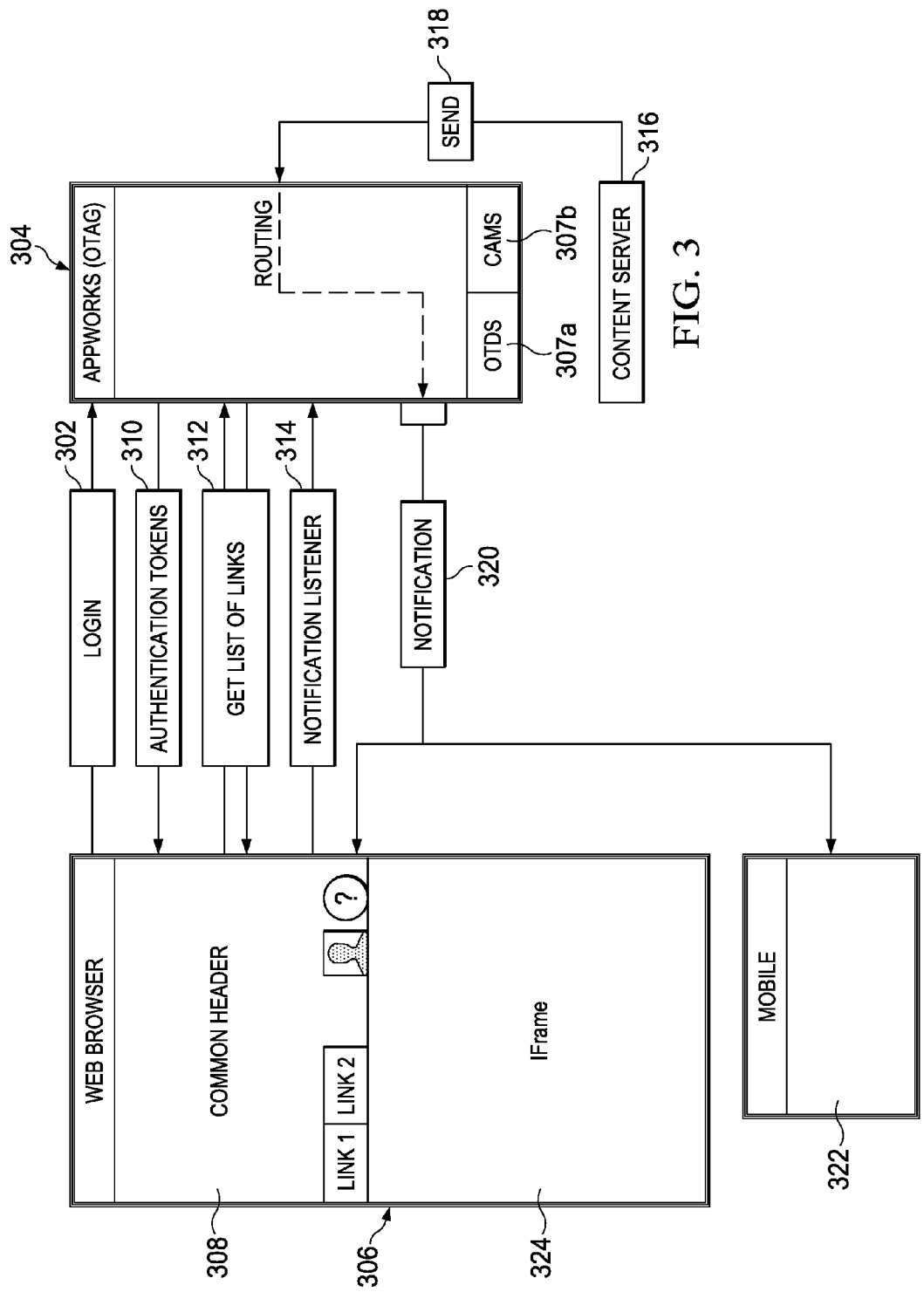
FIG. 3 is a block diagram illustrating one embodiment of an architecture for an integration application.

Turning now to FIG. 3, a block diagram of one embodiment of the implementation of an integration application in conjunction with AppWorks by OpenText Corporation is depicted. A flow chart of the login process and notification process is shown. At step 302, a user may login into an integration application server such as APPWORKS 304 of OpenText Application Gateway (OTAG) via a web browser 306. An instance of an integration application or common header 308 may be then launched at the web browser 306. At step 310, the APPWORKS 304 returns the authentication tokens to the integration application for storing them for the user at the web browser 306. A common login module may employ an authentication protocol such as OTDS 307a and CAMS 307b. The APPWORKS 304 is configured to communication using the OTDS 307a protocol for authentication. Alternatively, the CAMS 307b protocol may be used for authentication. The integration application or common header 308 is configured to provide a single sign-on functionality. The integration application or common header 308 uses the APIs of the APPWORKS 304 to provide the single sign-on functionality.

The APPWORKS 304 based on the account user signed on with, the runtime user signed on to, the group user is in, and other information about the user configures the instance of the integration application or common header 308 that the user will be running. For example, the APPWORKS 304 is going to give the user access to only applications A, B, and C, and they are going to look in a certain way.

The integration application or common header 308 may obtain, at step 312, a list of links from the APPWORKS 304. At step 314, the integration application or common header 308 may register with the APPWORKS 304 to listen for notifications. A content server 316 may send a notification at step 318 to the APPWORKS 304. At step 320, the APPWORKS 304 may route the notification to the web browser 306 and/or a mobile device 322. So the APPWORKS 304 recognizes there's a notification available and determines its recipients. The integration application or common header 308 is configured to handle this notification. Recipients listening to the notification's APIs through the APPWORKS 304 will get this notification. However, the integration application or common header 308 may handle all the notifications for the applications. The notification can show up in the integration application or common header 308. When a user clicks on the notification, a URL may be sent to that application.

The integration application or common header 308 provides API hooks to integrate an application into the integration application. For example, if an application needs to insert a notification up in the common header or the top bar the application calls one of the APPWORKS 304 APIs to communicate with the integration application or common header 308 to get the notification to appear.

When a notification is received from the APPWORKS 304 API, it is sent to the application in a child area 324 or iFrame. A click on the notification takes the user to the application in the child area 324 or iFrame and the extra information about the notification is provided. The application in the child area 324 or iFrame is configured to pop up a dialogue box for the notification. Clicking the notification opens a URL just like clicking on any another tab does. This action changes the iFrame source to that notification, so the iFrame source becomes the notification's URL which is the application's URL with some extra information at the end of it. The extra information at the end of it is a notification package.

Figure 4:
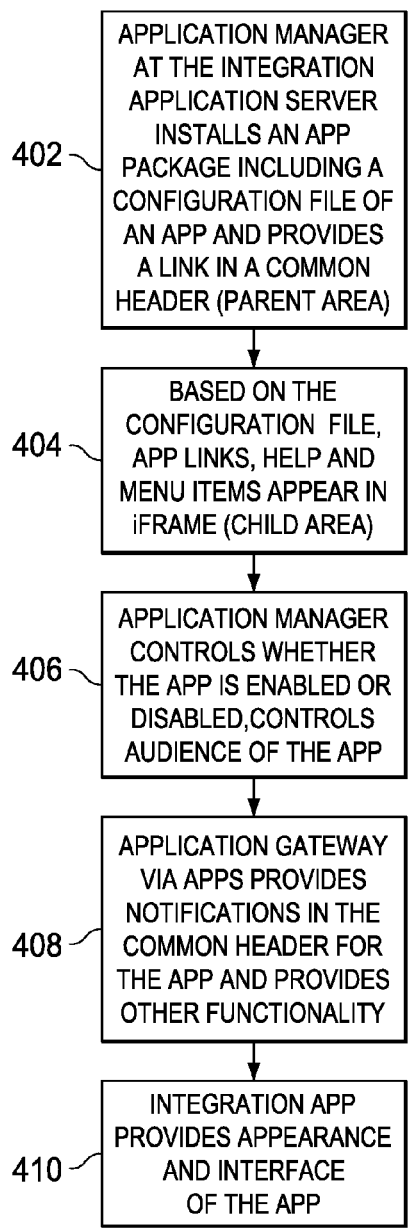
FIG. 4 is a flow diagram depicting one embodiment of a process for deploying an application to the integration application.

FIG. 4 depicts a flow chart that shows deployment of an application to the integration application consistent with one embodiment of the present invention. At step 402, an application manager located at an integration application server installs an application package including a configuration file (e.g., a zip file) of an application and provides a link to the application in a common header (a parent area). Based on contents of the configuration file, at step 404, application links, help and menu items are configured in iFrame (a browser window within the common header or the integration application web page that is labeled as a child area). The application manager of the integration application server such as OTAG application gateway controls whether the application is enabled or disabled, controls audience of the application (who can see it in their common header upon sign-on) at step 406. The integration application server such as the OTAG application gateway via APIs provides notifications in the common header for the application besides providing other administrative functionality at step 408. At step 410, the integration application is responsible for or otherwise controls the overall look and feel of the application.

Figure 5:
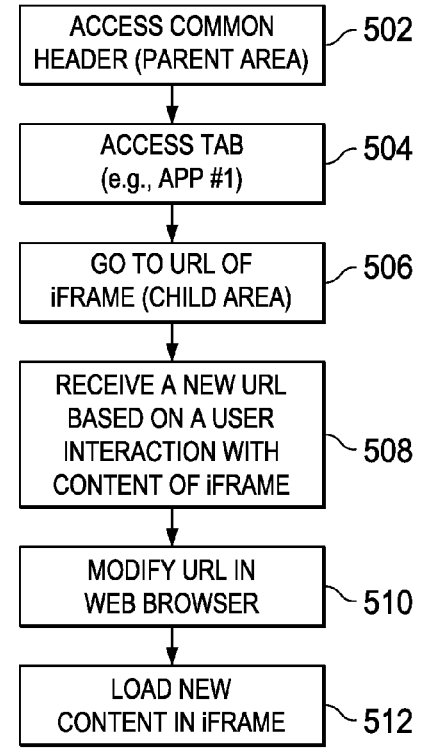
FIG. 5 is a flow chart depicting a process for integration with an application including modification of URL.

FIG. 5 depicts a flow chart that shows interaction with an application for modification of a URL consistent with one embodiment of the present invention. At step 502, upon a successful sign-on to the application gateway, a user gets access to the common header (i.e., the parent area) of an integration application in a main web page of a parent browser window. To access a particular application such as application #1, at step 504, the user can click on a tab provided in a top bar of the common header such as "Link App 1". In step 506, as the result of user's action of clicking the tab, in iFrame (the child area) an embedded web page of a particular URL associated with the application #1 opens up as a child browser window within the main web page showing the common header of the integration application. At step 508, an application manager may receive a new URL based on an interaction of the user with content of the iFrame (the child area). The application manager, at step 510, may modify the URL of the main web page showing in the parent browser window to reflect the new URL. Finally, at step 512, the application manager may load a new content corresponding to the new URL in the iFrame.

Figure 6:
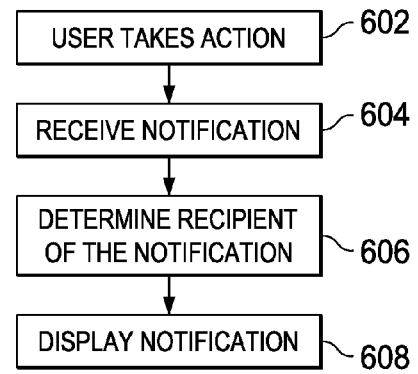
FIG. 6 is a flow diagram depicting one embodiment of a process for handling a notification.

FIG. 6 depicts a flow chart that shows the notification process consistent with one embodiment of the present invention. A notification is provided to a user in response to occurrence of some event, e.g., ones associated with an application during a user session on the application gateway. That is, notifications are provided when the user is logged-on to an integration application, e.g., via a single sign-on feature. So a user can take action by activating the integration application and performing a single sign-on. The integration application then registers for notifications using APIs provided by an application manager. The integration application provides user identification (the same identification that was received during single sign-on process). The application manager maintains a status corresponding to which users are currently accessing applications of the application manager. The integration application may receive the notification in the common header.

At step 602, a user takes an action that results in a notification. At step 604, the notification is received by the application manager based on the action taken by the user of another application. The application manager, at step 606, determines a recipient of the notification. The application manager determines a user or a group of users who should receive the notification based on the type or properties and/or content of the notification. At step 608, the integration application then displays the notification in the common header of those user(s) for which it is intended.

Figure 7:
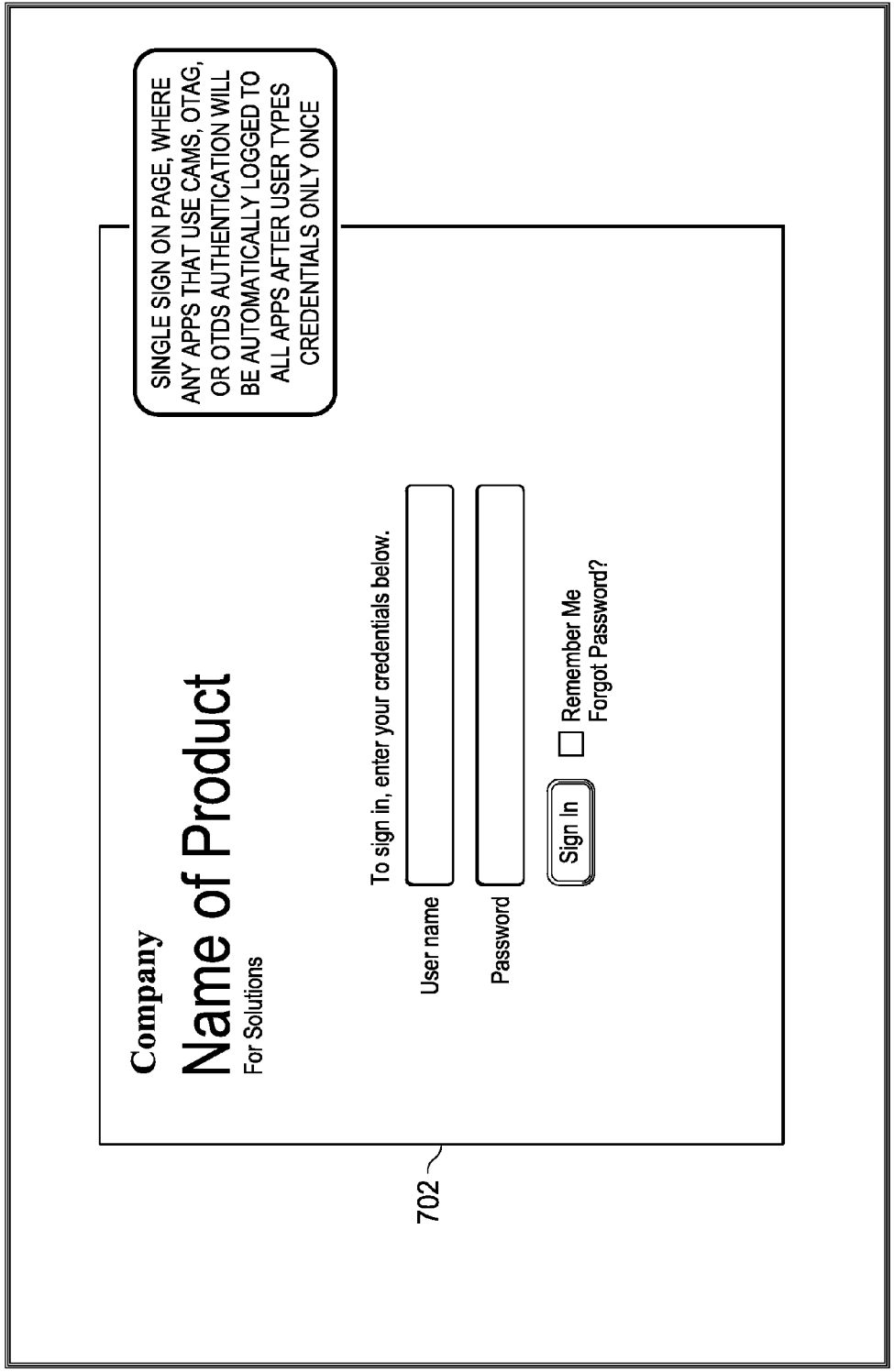
FIGS. 7-9 are illustrations of interfaces that can be utilized with an integration application.
Figure 8:
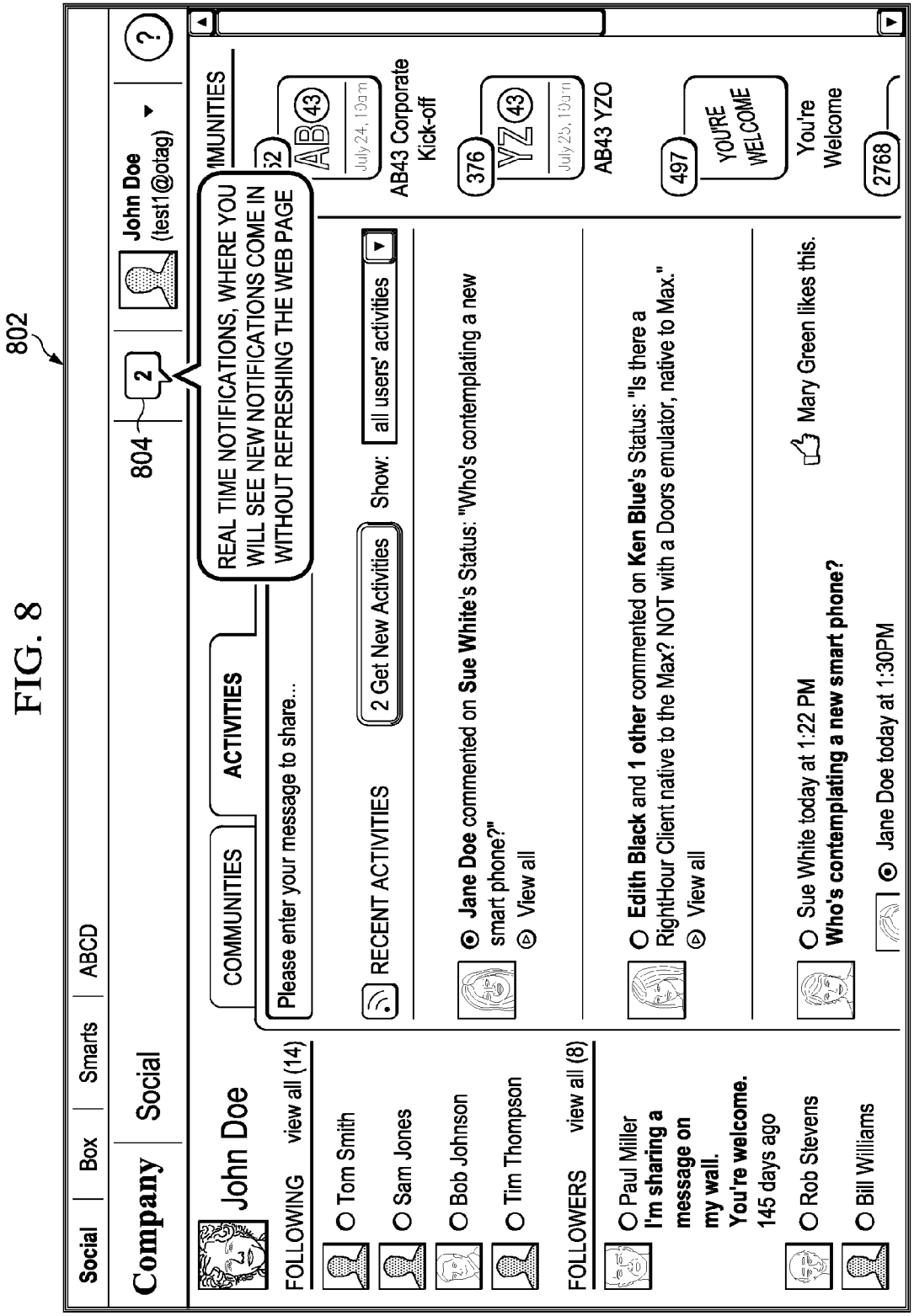
Figure 9:
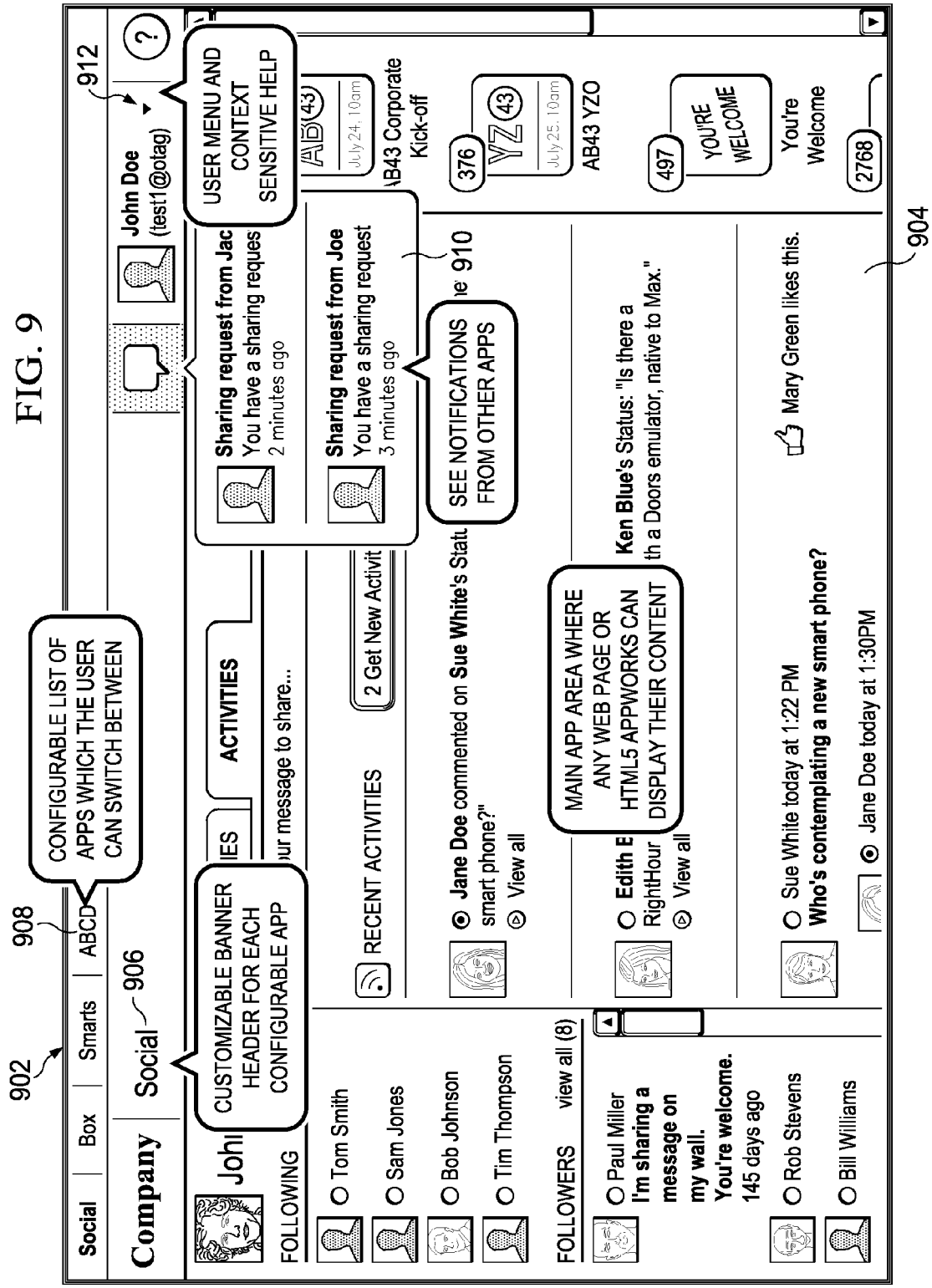

FIGS. 7-9 depict embodiments of interfaces that may be utilized with such an embodiment of an integration application (e.g., may be a single interface with a parent area and a child area presented by such an integration application). FIG. 7 depicts an interface 702 for a single sign-on. Any applications that use CAMS or OTDS authentication protocols for login may be automatically logged into after a user types credentials only once. FIG. 8 depicts an interface 802 for viewing an indication of notifications in an area 804. New notifications may be seen in real-time as they come in. There is no need to refresh the web page to see the updates to the notifications.

FIG. 9 depicts an interface 902 including a main application area 904 where any web page or APPWORKS can display their content. The interface 902 further includes an area A 906, an area B 908, an area C 910, and an area D 912. The area A 906 is configured to display a customizable banner header for each configurable application. The area B 908 is configured to display a configurable list of applications which the user can switch between. The area C 910 is configured to display notifications from other applications. The area D 912 is configured to display a user menu and context sensitive help.

Figure 10:
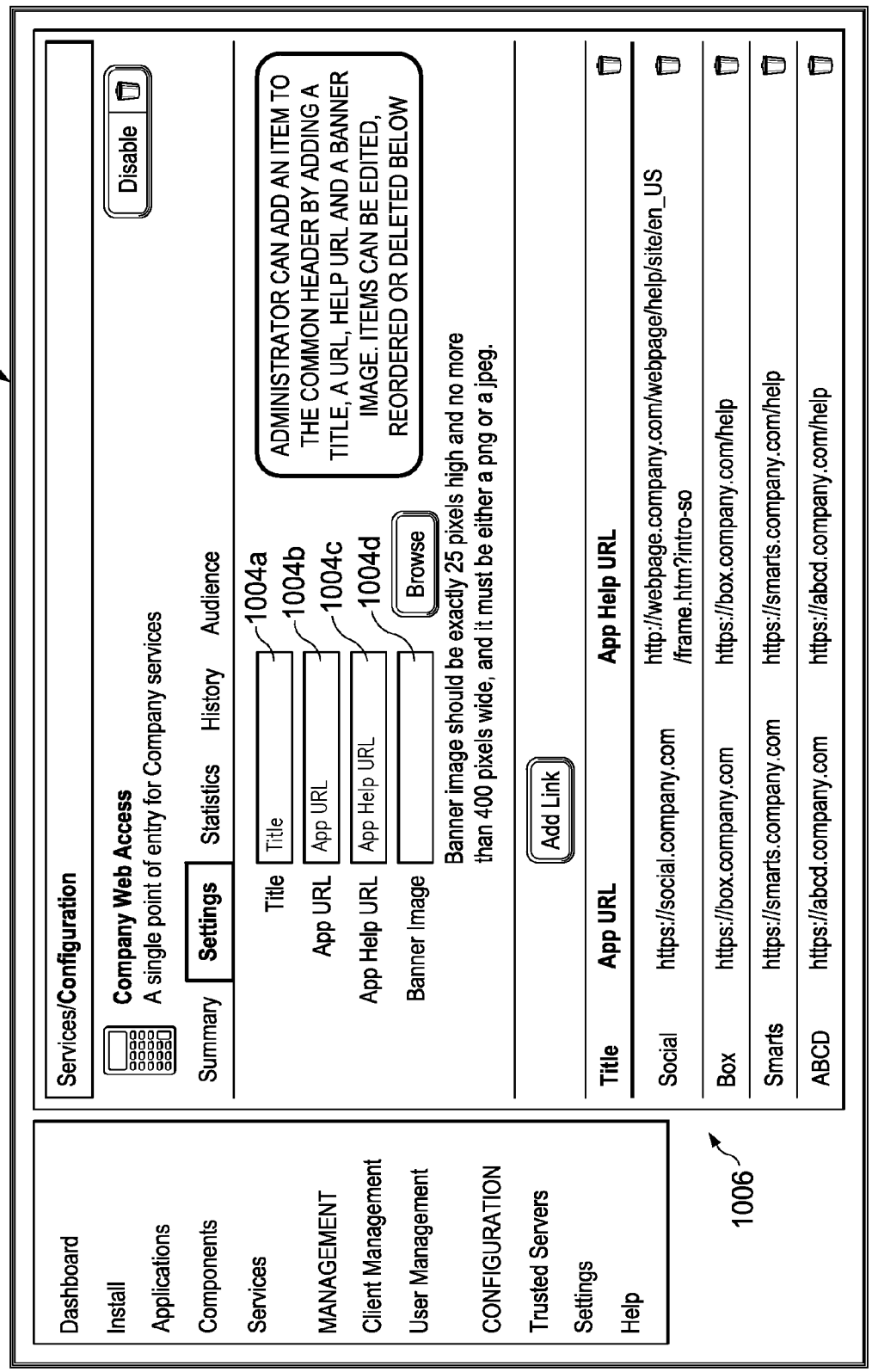
FIGS. 10-16 depict embodiments of interfaces which may be utilized to configure an integration application.
Figure 11:
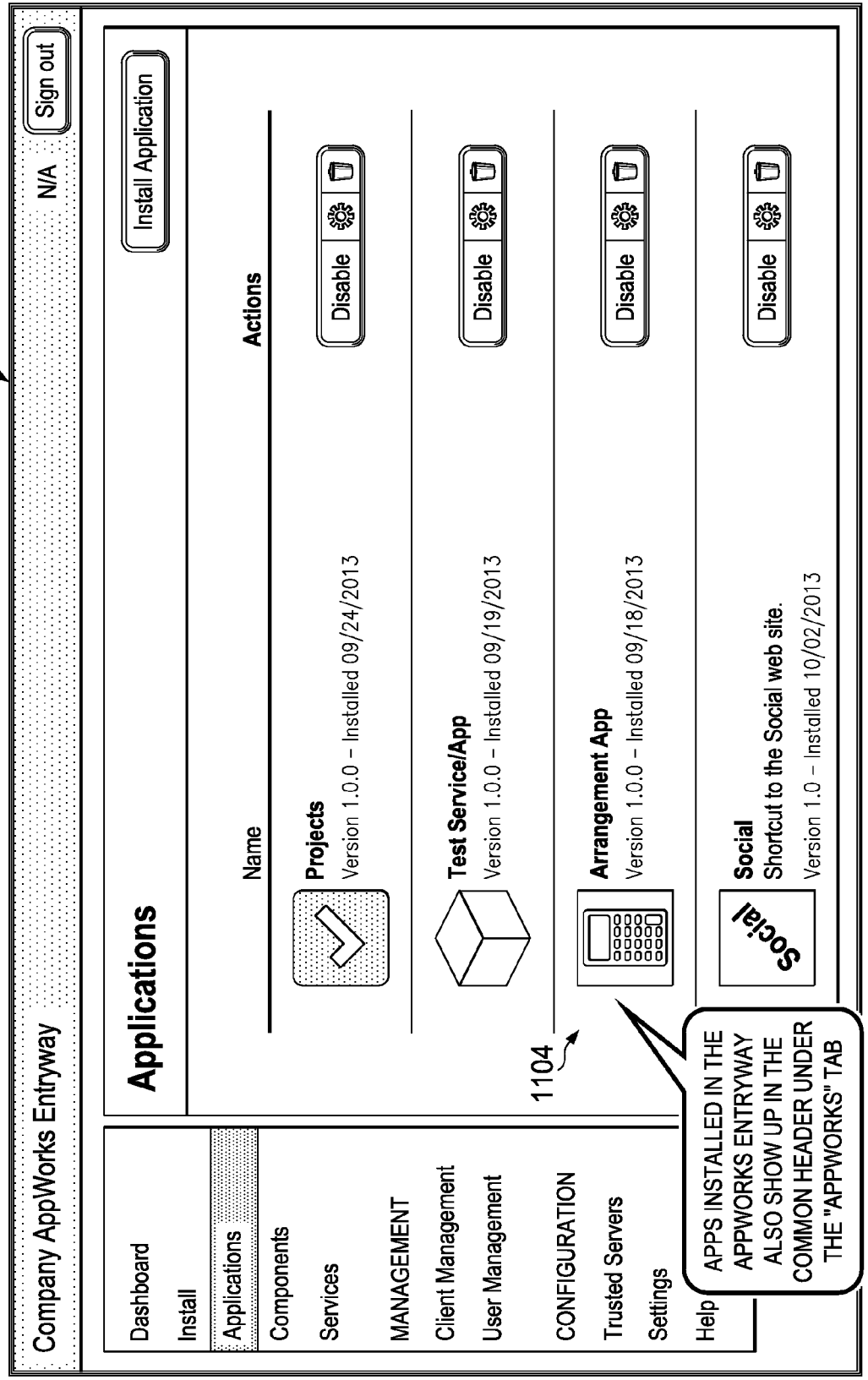

FIGS. 10-16 depict embodiments of interfaces which may be utilized by an administrator to configure such an integration application. FIG. 10 depicts an interface 1002 including four fields 1004a-1004d where an administrator can add an item to the common header. For example, via the field 1004a, the administrator can add a "Title," via the field 1004b, the administrator can add a "URL," via the field 1004c, the administrator can add a "Help URL," and via the field 1004d, the administrator can add a "Banner Image." The items can be edited, recorded or deleted in an area 1006. FIG. 11 depicts an interface 1102 including an area 1104 where applications installed in the APPWORKS also shown up in the common header under the "APPWORKS" tab.

Figure 12:
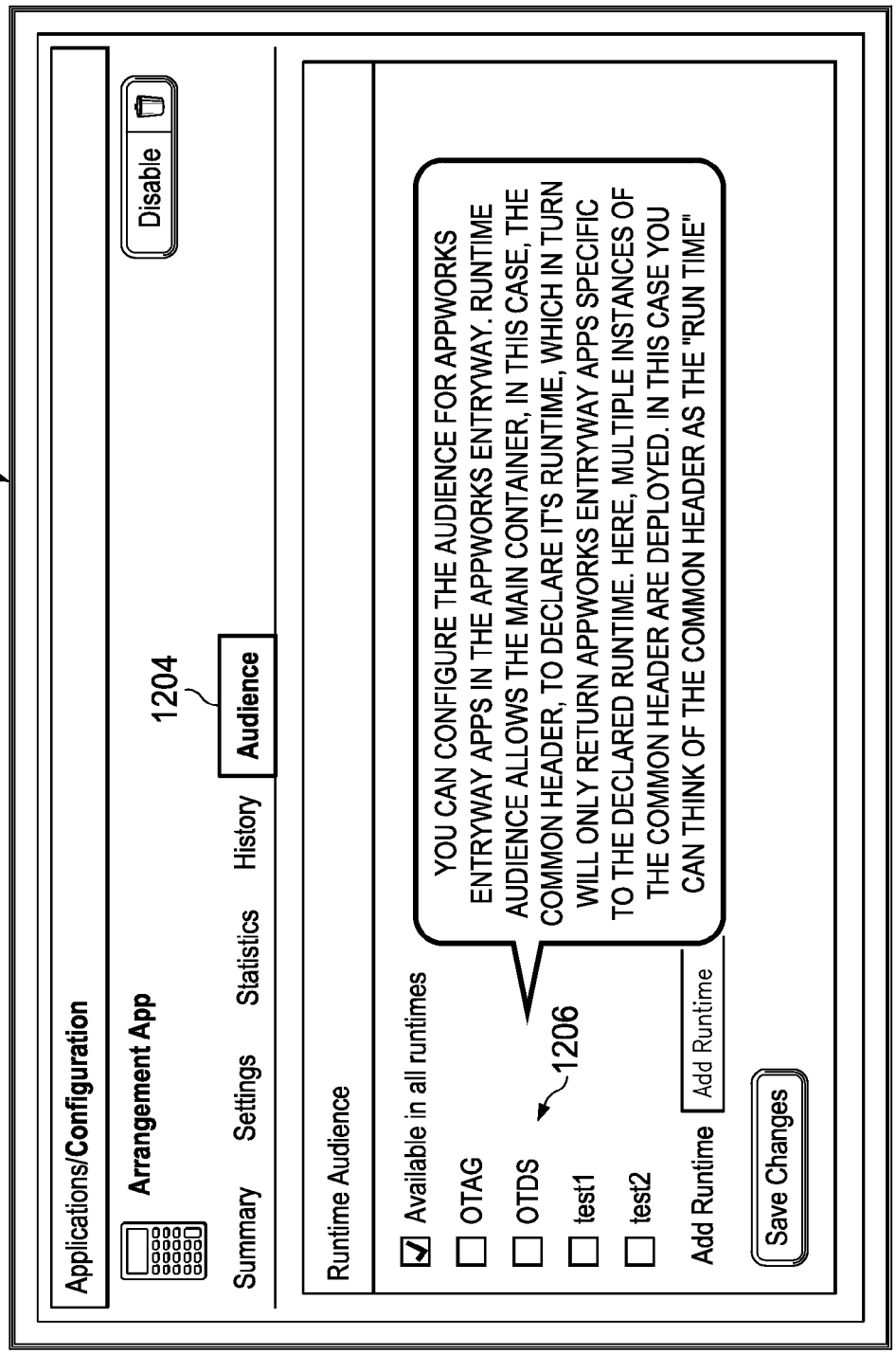
Figure 13:
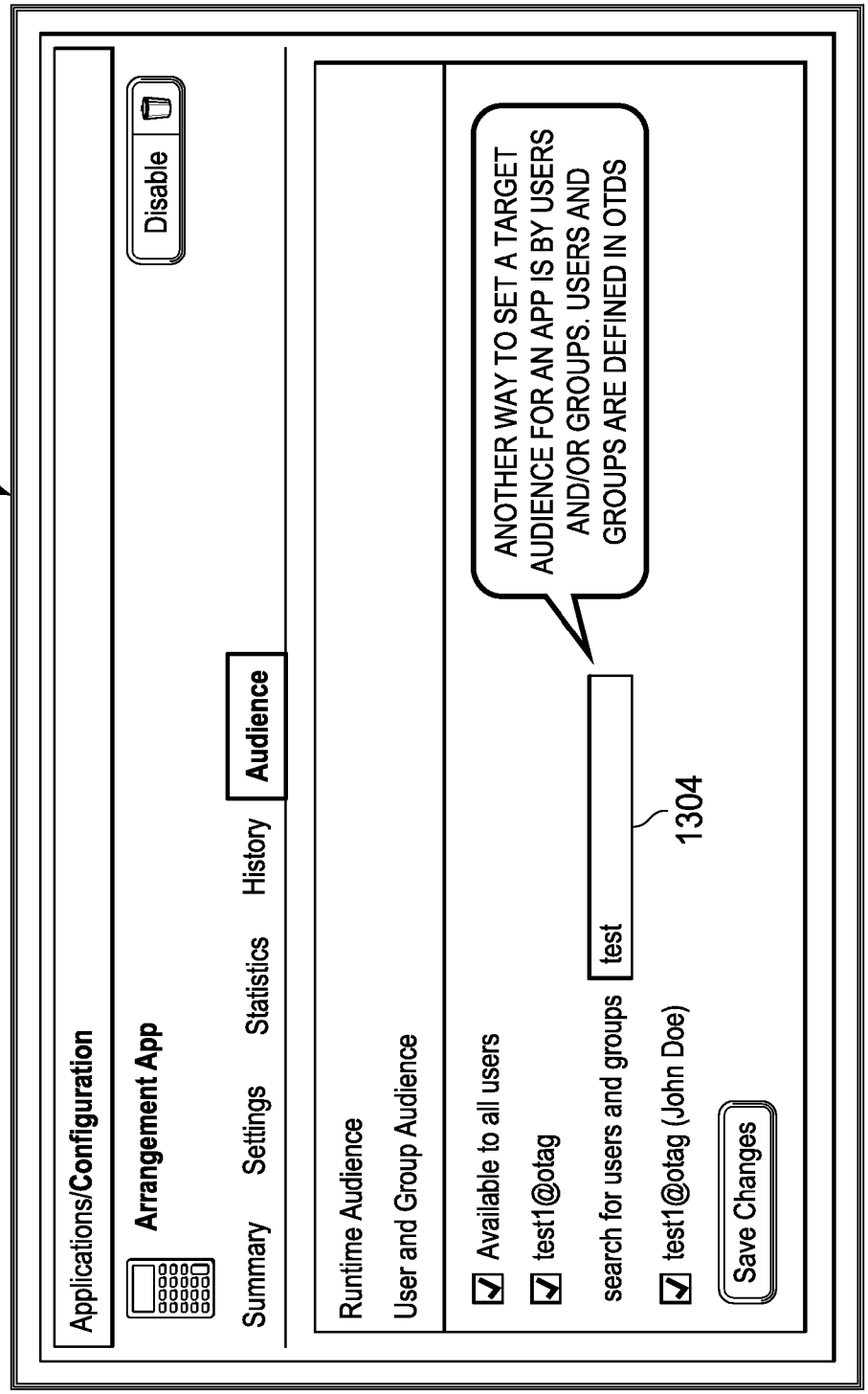

FIG. 12 depicts an interface 1202 including an audience tab 1204 which allows an administrator to configure the audience for applications of APPWORKS. Various runtimes 1206 may be declared for an application by selecting or deselecting available runtime options and/or adding a runtime. FIG. 13 depicts an interface 1302 including a field 1304 where users and/or groups may be set as a target audience for an application. The users and groups may be defined in OTDS.

Figure 14:
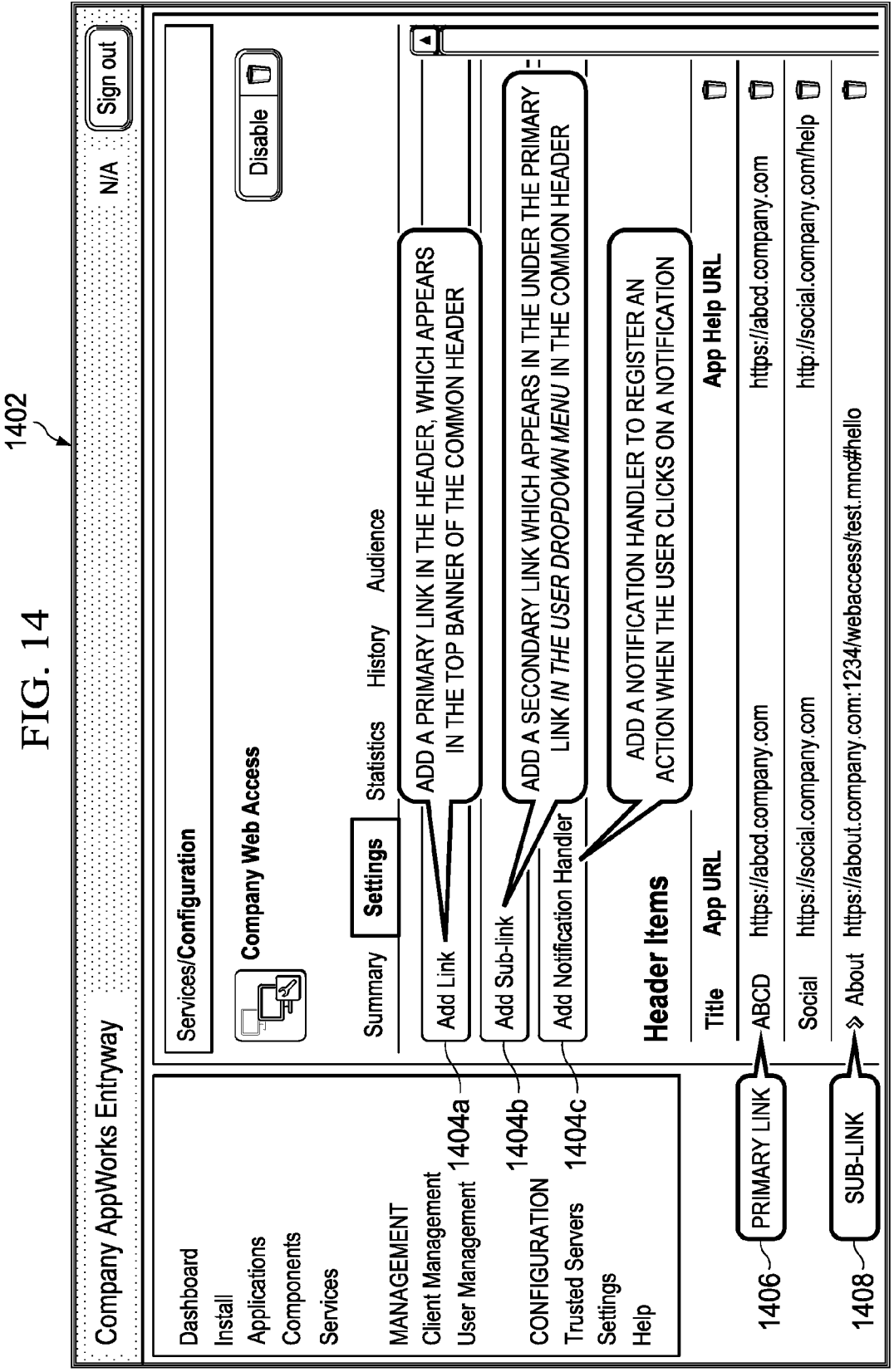
Figure 15:
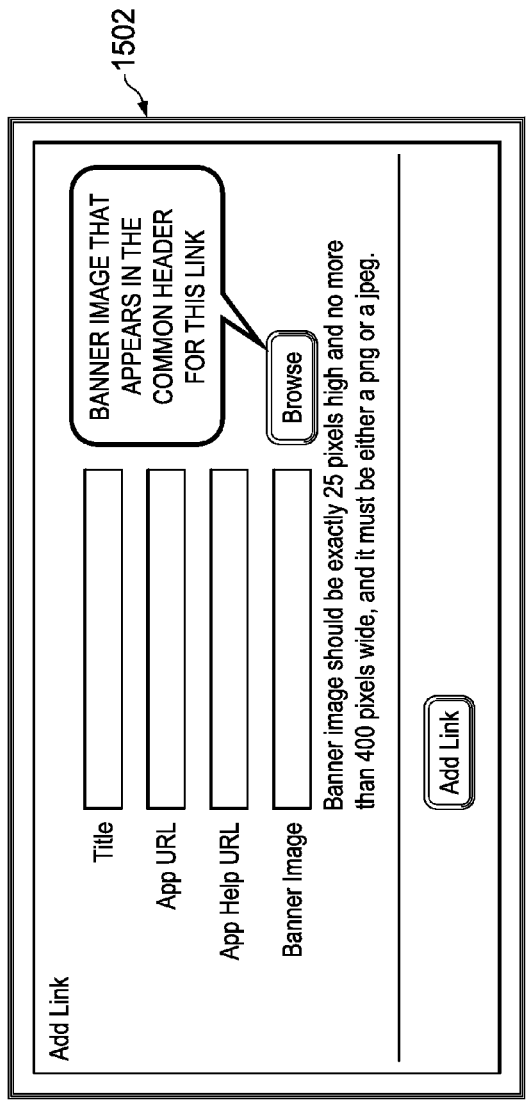
Figure 16:
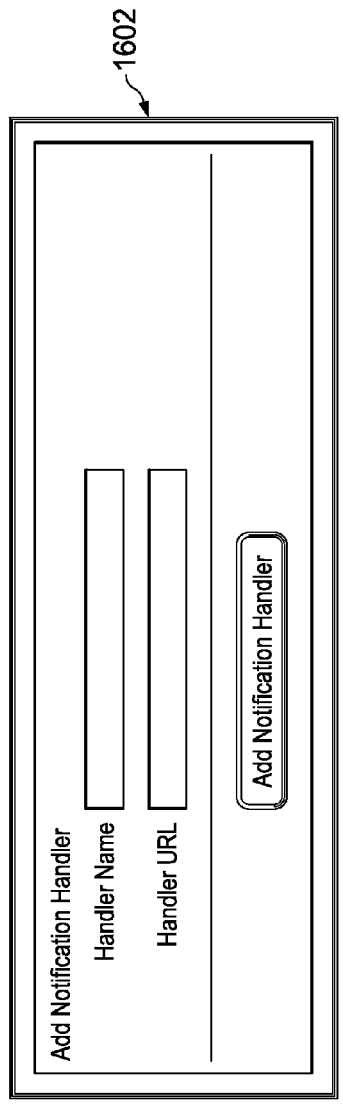

FIG. 14 depicts an interface 1402 including three buttons 1404a-1404c. The button 1404a is provided for adding a primary link 1406 in the header, which appears in the top banner of the common header. The button 1404b is provided for adding a secondary (sub)link 1408 which appears under the primary link 1406 in the user dropdown menu in the common header. The button 1404c is provided for adding a notification handler to register an action when the user clicks on a notification. FIG. 15 depicts an interface 1502 for adding the primary link 1406. FIG. 16 depicts an interface 1602 for adding a notification handler.

FIGS. 7-16 have been annotated with descriptions of the functionality offered by embodiments of such interfaces, however, it should be realized that those annotations are particular to the particular embodiment of the interface and integration application used with such an interface and should not in any manner be taken as applicable to, or limiting, to other embodiments as discussed herein.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment."

Embodiments can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments, the computer has access to at least one database over the network. In an embodiment, the database may be located on the same physical hardware as a platform server, and may be accessed locally through protocols such as but not limited to open database connectivity (ODBC).

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment, the computer-executable instructions may be lines of C++, Java, JavaScript, or any other programming or scripting code. In an embodiment, HTML may utilize JavaScript to provide a means of automation and calculation through coding. Other software/hardware/network architectures may be used. For example, the functions of embodiments may be implemented on one computer or shared among two or more computers. In one embodiment, the functions may be distributed in the network. Communications between computers implementing embodiments can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols. It will be understood for purposes of this disclosure that a module is one or more computing devices configured to perform one or more functions. A module may be hardware configured through the use of computer instructions or the like to present one or more interfaces which can be utilized to access these functions. Such interfaces include APIs, web services interfaces presented for a web services, remote procedure calls, remote method invocation, etc.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention. For example, though embodiments have been described for use in mobile environment it will be understood that other embodiments may be equally effectively utilized in environments that are not mobile.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for integration of multiple applications in a managed application environment, the system comprising:

a single interface deployed on a client computing device coupled over a network to an application server and an integration application server, the single interface configured for integrating multiple applications to a user, wherein the single interface has a parent area associated with a set of applications and a child area for presenting content associated with the set of applications, the client computing device includes a browser presenting the single interface and the integration application server includes an integration application to configure the client computing device in association with the browser;

a first link to a first application provided by the application server in the parent area to receive a first selection of the first application from the set of applications associated with the parent area for presenting content of the first application in the child area, wherein a parent URL associated with presentation of the content of the first application includes a domain identifier and parameters associated with the first application; and a second link to a second application provided by the application server in the parent area to receive a second selection of the second application from the set of applications associated with the parent area for presenting content of the second application in the child area without alteration to at least a portion of the parent area, wherein presenting the content of the second application includes updating the parent URL so that the parent URL associated with the content of the second application includes the domain identifier and parameters associated with the second application using a script for:

polling the browser to obtain data on the second application, determining that a child URL associated with the child area has changed, and updating the parent URL to reflect the child URL such that the parent URL includes the domain identifier and parameters associated with the child URL.

2. The system of claim 1, wherein the single interface further comprises:

a common login interface for receiving a user credential of the user through the single interface and authenticating the user with respect to the first application and the second application based on the user credential.

3. The system of claim 1, wherein the child area appears to be on a same domain as the parent area.

4. The system of claim 1, further comprising:

a notification area provided in the parent area for receiving a notification associated with the first application and presenting the notification through the parent area.

5. The system of claim 4, wherein content associated with the second application is being presented in the child area when the notification is received.

6. The system of claim 1, wherein the parent area is configured for a group including the user by a systems administrator and configuring the parent area includes configuring the set of applications and a user menu for the parent area.

7. The system of claim 1, wherein the integration application is configured to create a bookmark of the parent URL, such that by selecting the bookmark both the parent area and the child area displaying the content of the second application are presented in the single interface.

8. The system of claim 1, wherein the received first selection is determined using a portion of a child URL associated with the child area.

9. A method of providing multiple applications through a single interface, comprising:

providing a single interface deployed on a client computing device coupled over a network to an application server and an integration application server, the single interface configured for integrating multiple applications to a user, wherein the single interface has a parent area associated with a set of applications and a child area for presenting content associated with the set of applications, the client computing device includes a browser presenting the single interface and the integration application server includes an integration application to configure the client computing device in association with the browser;

receiving, from the parent area, a first selection of a first application from the set of applications associated with the parent area using a first link to a first application provided by the application server in the parent area;

presenting content of the first application in the child area, wherein a parent URL associated with presentation of the content of the first application includes a domain identifier and parameters associated with the first application;

receiving, from the parent area, a second selection of a second application from the set of applications associated with the parent area using a second link to a second application provided by the application server in the parent area; and presenting content of the second application in the child area without alteration to at least a portion of the parent area, wherein presenting the content of the second application includes updating the parent URL so that the parent URL associated with the content of the second application includes the domain identifier and parameters associated with the second application by, polling the browser to obtain data on the second application, determining that a child URL associated with the child area has changed, and updating the parent URL to reflect the child URL such that the parent URL includes the domain identifier and parameters associated with the child URL.

10. The method of claim 9, further comprising receiving a user credential of the user through the single interface and authenticating the user with respect to the first application and the second application based on the user credential.

11. The method of claim 9, wherein the child area appears to be on a same domain as the parent area.

12. The method of claim 9, further comprising receiving a notification associated with the first application and presenting the notification through the parent area.

13. The method of claim 12, wherein content associated with the second application is being presented in the child area when the notification is received.

14. The method of claim 9, wherein the parent area is configured for a group including the user by a systems administrator and configuring the parent area includes configuring the set of applications and a user menu for the parent area.

15. The method of claim 9, further comprising creating a bookmark of the parent URL, such that by selecting the bookmark both the parent area and the child area displaying the content of the second application are presented in the single interface.

16. The method of claim 9, wherein the received first selection is determined using a portion of a child URL associated with the child area.

17. A non-transitory computer readable medium, including instructions for integration of multiple applications in a managed application environment, the instructions for providing:
- a single interface deployed on a client computing device coupled over a network to an application server and an integration application server, the single interface configured for integrating multiple applications to a user, wherein the single interface has a parent area associated with a set of applications and a child area for presenting content associated with the set of applications, the client computing device includes a browser presenting the single interface and the integration application server includes an integration application to configure the client computing device in association with the browser;
- a first link to a first application provided by the application server in the parent area to receive a first selection of the first application from the set of applications associated with the parent area for presenting content of the first application in the child area, wherein a parent URL associated with presentation of the content of the first application includes a domain identifier and parameters associated with the first application; and
- a second link to a second application provided by the application server in the parent area to receive a second selection of the second application from the set of applications associated with the parent area for presenting content of the second application in the child area without alteration to at least a portion of the parent area, wherein presenting the content of the second application includes updating the parent URL so that the parent URL associated with the content of the second application includes the domain identifier and parameters associated with the second application using a script for:
    - polling the browser to obtain data on the second application,
    - determining that a child URL associated with the child area has changed, and
    - updating the parent URL to reflect the child URL such that the parent URL includes the domain identifier and parameters associated with the child URL.

18. The non-transitory computer readable medium of claim 17, wherein the single interface further comprises a common login interface for receiving a user credential of the user through the single interface and authenticating the user with respect to the first application and the second application based on the user credential.

* * * * *